J. S. SIMPSON.
Animal-Trap.
No. 224,960. Patented Feb. 24, 1880.
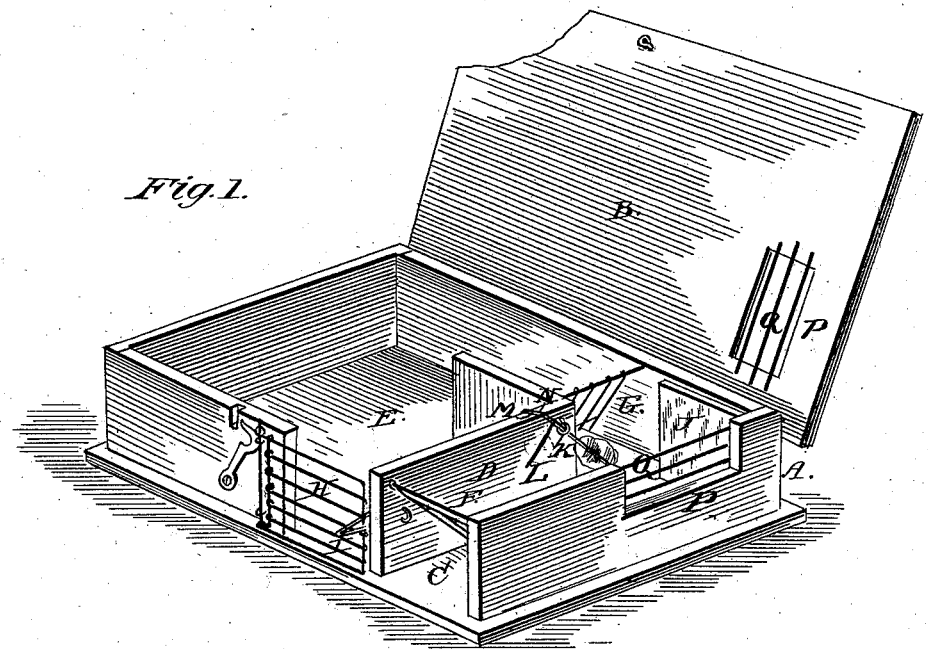
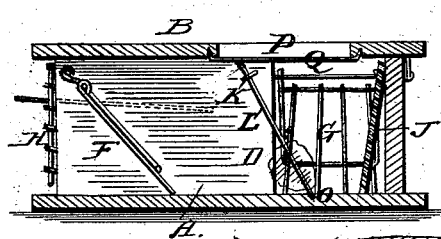
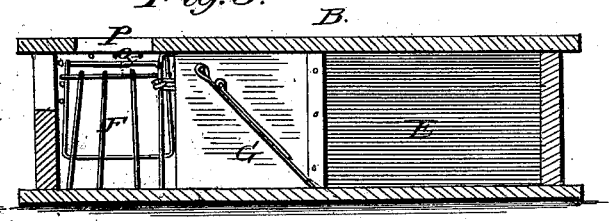
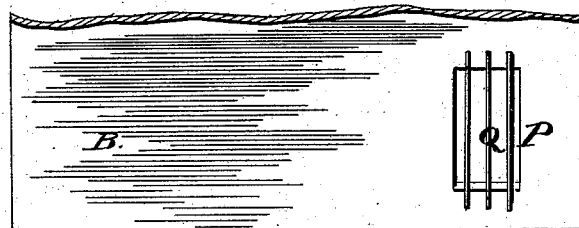
Witnesses:
Inventor:
J. S. Simpson,
by C. A. Snow & Co,
Att'ys.
N. PETERS, PHOTO-LITHOGRAPHER, WASHINGTON, D. C.

UNITED STATES PATENT OFFICE.

JOHN S. SIMPSON, OF NASHVILLE, TENNESSEE.

ANIMAL-TRAP.

SPECIFICATION forming part of Letters Patent No. 224,960, dated February 24, 1880.

Application filed September 26, 1879.

*To all whom it may concern:*

Be it known that I, JOHN S. SIMPSON, of Nashville, in the county of Davidson and State of Tennessee, have invented certain new and useful Improvements in Animal-Traps; and I do hereby declare that the following is a full, clear, and exact description of the invention, which will enable others skilled in the art to which it appertains to make and use the same, reference being had to the accompanying drawings, which form a part of this specification.

Figure 1 is a perspective view. Fig. 2 is a horizontal sectional view. Fig. 3 is a vertical sectional view, and Fig. 4 is a top or plan view of the trap-box with the cover open.

Corresponding parts in the several figures are denoted by like letters of reference.

This invention has relation to animal-traps; and it consists, essentially, in the combination, with a trap-box having a hinged cover and a dividing-wall, of a bait-hook fitted in an eye or loop and notch of said dividing-wall, and secured in position by the hinged cover, as will be hereinafter more fully set forth.

In the drawings, A represents the box or body of the trap, which is provided with a hinged cover, B. The box has an entrance, C, divided by a wall, D, from the compartment E. The entrance is provided with a suitably-constructed fall-door, F, and a similar fall-door, G, separates the entrance from compartment E. The latter compartment is also provided with a door, H, held closed by a spring-latch, I. Upon the inside of the box, at the end of the entrance, is secured a looking-glass, J. Upon the side of the wall D which faces the entrance-passage is secured a loop, K, through which passes diagonally a pointed rod, L, provided at its upper end with a hook, M, adapted to fit in a notch or recess, N, in the upper edge of the wall. The lower pointed end of said rod fits in an opening, O, in the bottom of the trap. Suitable bait may be secured upon the said rod, to aid by its odor in attracting the victims. When the cover is closed it fits over the hooked end of the rod, the displacement or disarrangement of which is thereby avoided.

The side of the trap-box adjoining the looking-glass and the cover just above said glass are provided with openings P, of sufficient size to admit the necessary light; and to prevent the escape of the captured animals said openings are provided with suitable bars Q.

When an animal approaches the entrance to the trap it will perceive its image in the glass J, and thereby be decoyed into the trap, the door F closing automatically, so as to prevent its escape. When, in its efforts to escape, the captured animal passes through door G, the latter, on closing, confines it in the compartment E, from which it may afterward be removed through door H or cover B.

The construction of my improved trap is simple and inexpensive, and it is perfect in operation.

Having thus described my invention, I claim and desire to secure by Letters Patent of the United States—

The combination of the trap-box A, having hinged cover B, and wall D, provided with loop K and notch or recess N, with the pointed rod L, having hook M, as set forth.

In testimony that I claim the foregoing as my own I have hereto affixed my signature in presence of two witnesses.

JOHN STETSON SIMPSON.

Witnesses:
 WILLIAM HENRY TRAFFORD,
 ROBERT ANDERSON BALLOWE.